(12) United States Patent
Maeda

(10) Patent No.: US 11,211,643 B2
(45) Date of Patent: Dec. 28, 2021

(54) METHODS AND SYSTEMS FOR DYNAMICALLY CONTROLLING DISCHARGE RATIO OF A PLURALITY OF BATTERIES PACKS

(71) Applicant: Panasonic Avionics Corporation, Lake Forest, CA (US)

(72) Inventor: Kenji Maeda, Irvine, CA (US)

(73) Assignee: Panasonic Avionics Corporation, Lake Forest, CA (US)

(*) Notice: Subject to any disclaimer, the term of this patent is extended or adjusted under 35 U.S.C. 154(b) by 136 days.

(21) Appl. No.: 16/693,871

(22) Filed: Nov. 25, 2019

(65) Prior Publication Data

US 2021/0159551 A1    May 27, 2021

(51) Int. Cl.
| | |
|---|---|
| *H01M 10/44* | (2006.01) |
| *H01M 10/48* | (2006.01) |
| *H01M 50/20* | (2021.01) |
| *H01M 10/42* | (2006.01) |

(52) U.S. Cl.
CPC ......... *H01M 10/44* (2013.01); *H01M 10/482* (2013.01); *H01M 50/20* (2021.01); *H01M 2010/4271* (2013.01); *H01M 2010/4278* (2013.01)

(58) Field of Classification Search
CPC .... H01M 10/44; H01M 50/20; H01M 10/482; H01M 2010/4278; H01M 2010/4271
USPC ....................................................... 320/135
See application file for complete search history.

(56) References Cited

U.S. PATENT DOCUMENTS

| | | | |
|---|---|---|---|
| 9,755,440 B2* | 9/2017 | Ishibashi | H02J 7/0018 |
| 10,063,067 B2* | 8/2018 | Chiueh | H02J 7/0068 |
| 10,393,830 B2* | 8/2019 | Nakamura | G01R 33/543 |
| 10,554,073 B2* | 2/2020 | Ehrmantraut | G05F 5/00 |
| 10,608,463 B1* | 3/2020 | Aronov | G01R 31/3842 |
| 2014/0203780 A1 | 7/2014 | Hu et al. | |
| 2015/0067362 A1 | 3/2015 | Sultenfuss et al. | |
| 2017/0025869 A1 | 1/2017 | Lundholm et al. | |
| 2018/0248396 A1 | 8/2018 | Kaetes | |

(Continued)

FOREIGN PATENT DOCUMENTS

| | | |
|---|---|---|
| CN | 102064586 | 5/2011 |
| CN | 107370195 | 11/2017 |

(Continued)

*Primary Examiner* — M Baye Diao
(74) *Attorney, Agent, or Firm* — Klein, O'Neill & Singh, LLP (57) ABSTRACT

Methods and systems are provided for an electronic device. One method includes storing a data structure at a memory device by a processor, where the data structure is configured to store a plurality of parameters used for determining a discharge ratio of a first battery pack and a second battery pack of a charging system of a device, the discharge ratio indicating a relative rate of discharge of the first battery pack and the second battery pack; detecting by the processor, a discharge condition associated with at least one of the first battery pack and the second battery pack; utilizing by the processor, the data structure for determining the discharge ratio; and controlling by the processor, based on the determined discharge ratio, a discharge rate of the first battery pack using a first voltage controller and a discharge rate of the second battery pack using a second voltage controller.

21 Claims, 6 Drawing Sheets

(56) References Cited

U.S. PATENT DOCUMENTS

2021/0088591 A1* 3/2021 Naha ................. H02J 7/005
2021/0162884 A1* 6/2021 Villanueva ........ H01M 10/6568

FOREIGN PATENT DOCUMENTS

| CN | 101420130 | | 4/2019 | | |
|----|-----------|---|--------|---|---|
| CN | 208986128 | | 6/2019 | | |
| IN | WO-2021038595 | A1 * | 3/2021 | ............. | B60L 50/50 |
| JP | 2017154637 | A * | 9/2017 | ............. | H02J 7/007 |
| JP | 2019106884 | | 6/2019 | | |

* cited by examiner

METHODS AND SYSTEMS FOR DYNAMICALLY CONTROLLING DISCHARGE RATIO OF A PLURALITY OF BATTERIES PACKS

TECHNICAL FIELD

The present disclosure relates to power management in electronic devices, and more particularly, to controlling relative discharge of at least two battery packs configured to provide power to one or more components of an electronic device.

BACKGROUND

Rechargeable battery packs, e.g. Lithium-Ion battery packs are commonly used to power different types of devices, including personal electronic devices (e.g. laptops, notebook computers, mobile phones and others), seat devices on transportation vehicles (e.g. smart monitors interfacing with in-flight entertainment systems), and other device types. Standard off-the shelf battery packs are typically available from different companies. The standard battery packs come in different specifications and geometries (e.g. prismatic, cylindrical and other shapes). The standard battery pack specifications specify a battery capacity (e.g. in Watts-hour), a nominal voltage, a nominal capacity (e.g. in milli-amp hours), initial impedance, a maximum charge current, a maximum charge voltage a maximum discharge, life expectancy at a certain temperature, and a charge/discharge ratio.

To design a power management system for a device, a designer typically looks at the total power requirements and then attempts to match the requirements with standard battery packs. If a standard battery pack is available, then one is able to use the standard battery pack. In some instances, the power requirements are not met by standard battery packs and instead a custom battery pack is designed. One reason why a custom battery pack is used is because conventional state of the art techniques are not able to efficiently manage a discharge ratio of multiple battery packs to meet the power requirements. The custom battery pack approach is undesirable because it is expensive and time consuming.

Furthermore, conventional systems that use off-the-shelf multiple battery packs have short comings. For example, the multiple battery packs may have to discharge at the same time to meet power requirements, however, the battery pack output voltage of each battery pack has to be in a similar state for simultaneous discharge. Conventional systems also do not control the discharge ratio of the battery packs, which may result in imbalance between the state of the charge/state of health of the battery packs. This may result in uneven battery pack decay, and hence, is undesirable.

Continuous efforts are being made to develop technology that enables the use of multiple standard battery packs to meet power requirements for different devices.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

Computer executable components of the present disclosure can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, an innovative battery management system (BMS) with multiple battery packs is provided. The BMS uses a voltage converter between system power and an output of each battery pack. The relative discharge, i.e. the discharge ratio of the battery packs is controlled by alternating the output voltage setting of the voltage converters. The output from the voltage converters is controlled by a microcontroller that monitors battery pack conditions to determine the discharge ratio. This enables the BMS to utilize the available capacity of multiple battery packs without compromising system functionality and balances the state of charge and state of health of each battery pack to avoid uneven battery pack decay. Details of the BMS are provided below.

Figure 1A:
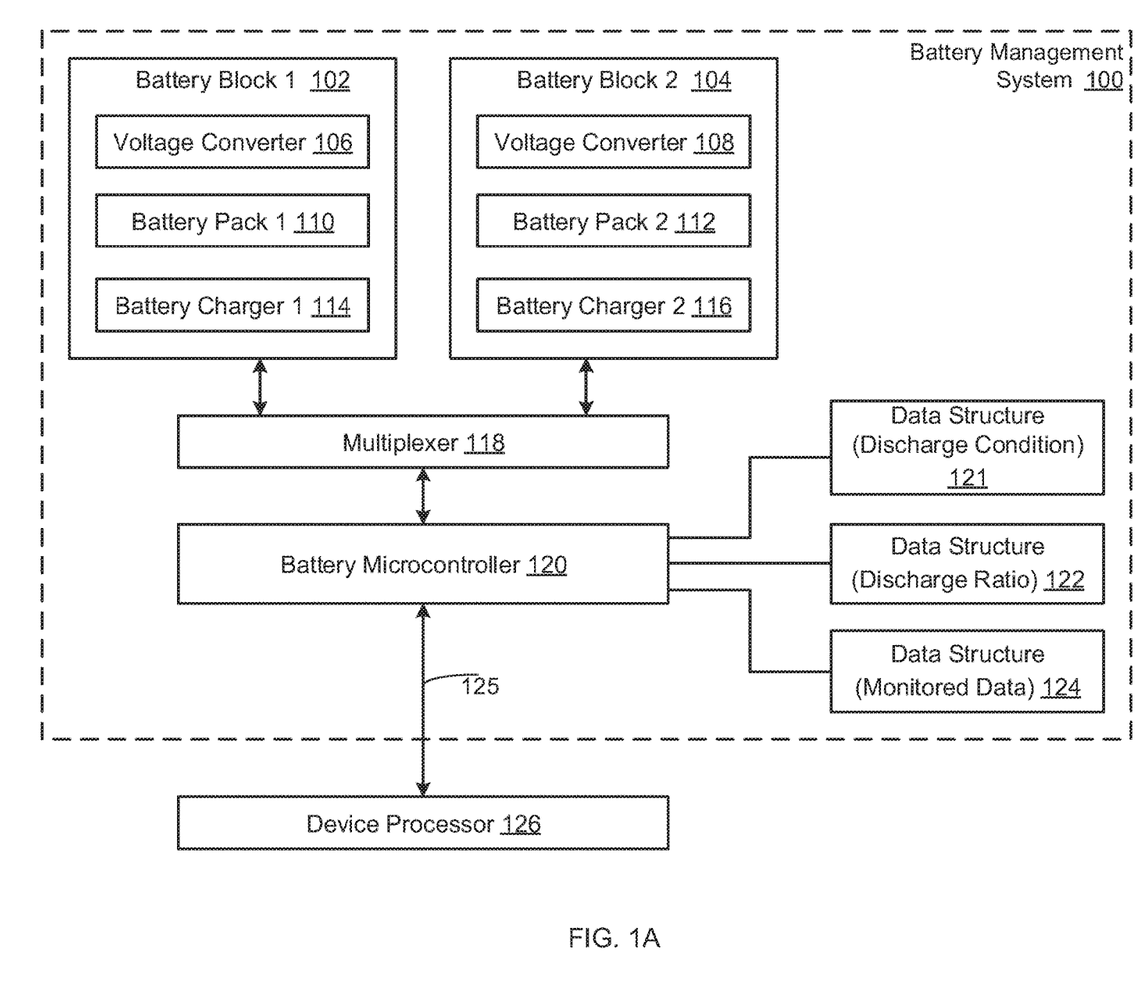
FIG. 1A shows an example of a battery management system, according to one aspect of the present disclosure.

BMS 100: FIG. 1A shows an example of a BMS 100, according to one aspect of the present disclosure. BMS 100 is configured to provide power to an "electronic device" having a device processor 126 and other components (not shown). As an example, the electronic device may include a laptop computer, a notebook computer, a mobile phone, a seat device (may also be referred to as smart monitor) on a transportation vehicle, an electric car; or any other device type including devices connected to a solar powered system. When installed on an aircraft, the seat device is configured to be a part of an aircraft passenger in-flight entertainment (IFE) system, such as the Series 2000, 3000, eFX, eX2, eXW, eX3, NEXT, and/or any other IFE system developed and provided by Panasonic Avionics Corporation (without derogation of any trademark rights of Panasonic Avionics Corporation) of Lake Forest, Calif., the assignee of this application. It is noteworthy that the adaptive aspects of the present disclosure are not limited to any specific device type or an IFE system.

In one aspect, BMS 100 may include at least two battery blocks 102 and 104 with a plurality of components. Each battery block includes a battery charger (e.g. 114 and 116) that charges individual battery packs 110 and 112, respectively. In one aspect, the battery packs 110 and 112 are standard off-the-shelf battery packs that are commercially available from different manufacturers. The adaptive aspects disclosed herein are not limited to any specific manufacturer or battery pack type.

The battery pack specifications provide an operating temperature, a storage temperature, a nominal voltage, a nominal capacity, a maximum charge current, a maximum charge voltage, a maximum discharge, a life expectancy, battery dimensions, battery weight, an overcharge detection voltage, an over discharge detection voltage, an overcharge detection current, capacity tolerance, and an over discharge detection current. It is noteworthy that the battery packs 110 and 112 may have different sizes, different ages, different power requirements, different geometries, different manufacturing tolerances (e.g. capacity tolerance), and different temperature requirements. Furthermore, although only two battery packs have been shown as an example, the various adaptive aspects described herein can be implemented with more than two battery packs.

In one aspect, the battery packs 110 and 112 include a Lithium-ion cell, an internal battery management and safety unit for under/over voltage protection, overcurrent protection, and short circuit protection. The battery packs 110 and 112 also include sensors for temperature measurement, and a battery fuel gauge that provides each battery pack's state of charge (SOC) and state of health (SOH). SOC is the level of charge of the battery pack relative to its total capacity. SOH is represented as a percentage indicating the health of the battery pack compared to its initial state, when the battery pack is deployed. The battery fuel gauge can predict how much longer, under specific operating conditions, the battery pack can continue to provide power. Technical details of the battery pack components may vary from one manufacturer to another as well as from one battery pack type to another.

In one aspect, an output of battery pack 110 is controlled by a voltage converter 106, while an output of battery pack 112 is controlled by voltage converter 108. The outputs from the voltage converters 106 and 108 are used to control the relative discharge of the battery packs (referred to as the discharge ratio), as described below in detail.

In one aspect, BMS 100 also includes a battery microcontroller (may be referred to as microcontroller) 120, executing firmware instructions out of a memory device (not shown). It is noteworthy that the microcontroller 120 may be a programmable, hardware-based, general-purpose or special-purpose microprocessor, a digital signal processor (DSP), a programmable controller, an application specific integrated circuits (ASIC), a programmable logic device (PLD), or the like, or a combination of such devices.

In one aspect, the microcontroller 120 interfaces with the device processor (may be referred to as processor) 126 of an electronic device (e.g. device 300, FIG. 3) via an interconnect 125. Processor 126 executes programmable instructions out of a memory device (not shown). The executable instructions vary based on the overall function of the processor 126 and the electronic device. Processor 126 may be a programmable, hardware-based, general-purpose or special-purpose microprocessor, a digital signal processor (DSP), a programmable controller, an application specific integrated circuit (ASIC), a programmable logic device (PLD), or the like, or a combination of such devices.

Furthermore, as an example, interconnect 125 may represent any one or more separate physical buses and/or point-to-point connections, connected by appropriate bridges, adapters and/or controllers. The interconnect 125 may include, for example, an I2C bus, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. The adaptive aspects described herein are not limited to any specific interconnect or bus type.

In one aspect, the microcontroller 120 interfaces with battery blocks 102 and 104 via a multiplexor (Mux) 118. As an example, Mux 118 is configured to operate using the I2C (Inter-Integrated Circuit) protocol. I2C is a serial protocol for a two-wire interface to connect low-speed devices like microcontrollers, A/D (analog/digital) and D/A (digital/analog) converters, I/O (input/output) interfaces and other similar peripheral devices. The adaptive aspects of the present disclosure are not limited to the I2C or any other protocol.

To manage the discharge ratio of the battery packs 110 and 112, the microcontroller 120 has access to a data structure 121 that stores discharge condition parameters, a data structure 122 that stores discharge ratio for the battery packs and a data structure 124 that stores monitored data collected from the battery blocks 102 and 104, as described below in detail. It is noteworthy that for convenience, although separate data structures 121, 122 and 124 are shown, the adaptive aspects of the present disclosure can be implemented using a single data structure, two separate data structures or more than three data structures.

The discharge condition parameters at data structure 121 provide an indication of when the battery packs 110 and/or 112 can be discharged. The discharge conditions are typically based on battery pack specifications/data sheets, e.g. the datasheets may indicate a discharge current at a certain ambient temperature range. In one aspect, the microcontroller 120 identifies a discharge condition based on a battery pack type.

In one aspect, the microcontroller 120 monitors various sensors (not shown) at the battery packs 110 and 112, as well as sensors (not shown) at the battery chargers 114 and 116. The microcontroller 120 collects monitored sensor data from the battery packs 106 and 108 and the battery chargers 114 and 116. The collected data is stored in data structure 124. An example of data structure 124 is shown in FIG. 1C. In one aspect, data structure 124 stores battery pack temperature 124A, battery pack voltage 124B, battery pack current 124C, SOC 124D, SOH 124E and time to empty the battery pack 124F. Parameters 124A-124F are obtained from the sensors of battery packs 110 and 112. Data structure 124 also stores a charge current 124G, charge voltage 124H and an input charging voltage 124I that are obtained from battery chargers 114 and 116.

In one aspect, the microcontroller 120 uses the monitored data to determine a discharge ratio from data structure 122. FIG. 1D shows an example of data structure 122 that includes a SOH value 150, a SOC value 152, a battery discharge voltage 154 and a battery discharge current 155 for each battery pack with a corresponding discharge ratio 156. In one aspect, the data structure 122 is configurable and varies based on battery pack specifications. The data structure 122 may be pre-programmed with discharge ratios and updated while the battery packs are being used.

Based on the discharge ratio of data structure 122, the microcontroller 120 instructs the voltage converters 106 and 108 to adjust the output from each battery pack to balance the discharge between battery packs 110 and 112 such that the SOH and/or SOC of both the battery packs are equal or within a pre-determined threshold value. As an example, if an output voltage of the voltage converter 106 is higher than an output of the voltage converter 108, then the discharge ratio of the battery pack 110 as compared to that of the battery pack 112 may be deemed to be higher, if the output voltage of the voltage converter 106 is lower than an output of the voltage converter 108, then the discharge ratio of the battery pack 110 as compared to that of the battery pack 112 may be deemed to be lower, and if the output voltage of the voltage converter 106 is same as the output of the voltage converter 108, then the discharge ratio of the battery pack 110 as compared to that of the battery pack 112 is equal. This enables the microcontroller 120 to control the discharge of each battery pack based on current conditions regardless of battery pack size, battery pack age, battery pack power requirements or any other factors.

Figure 1B:
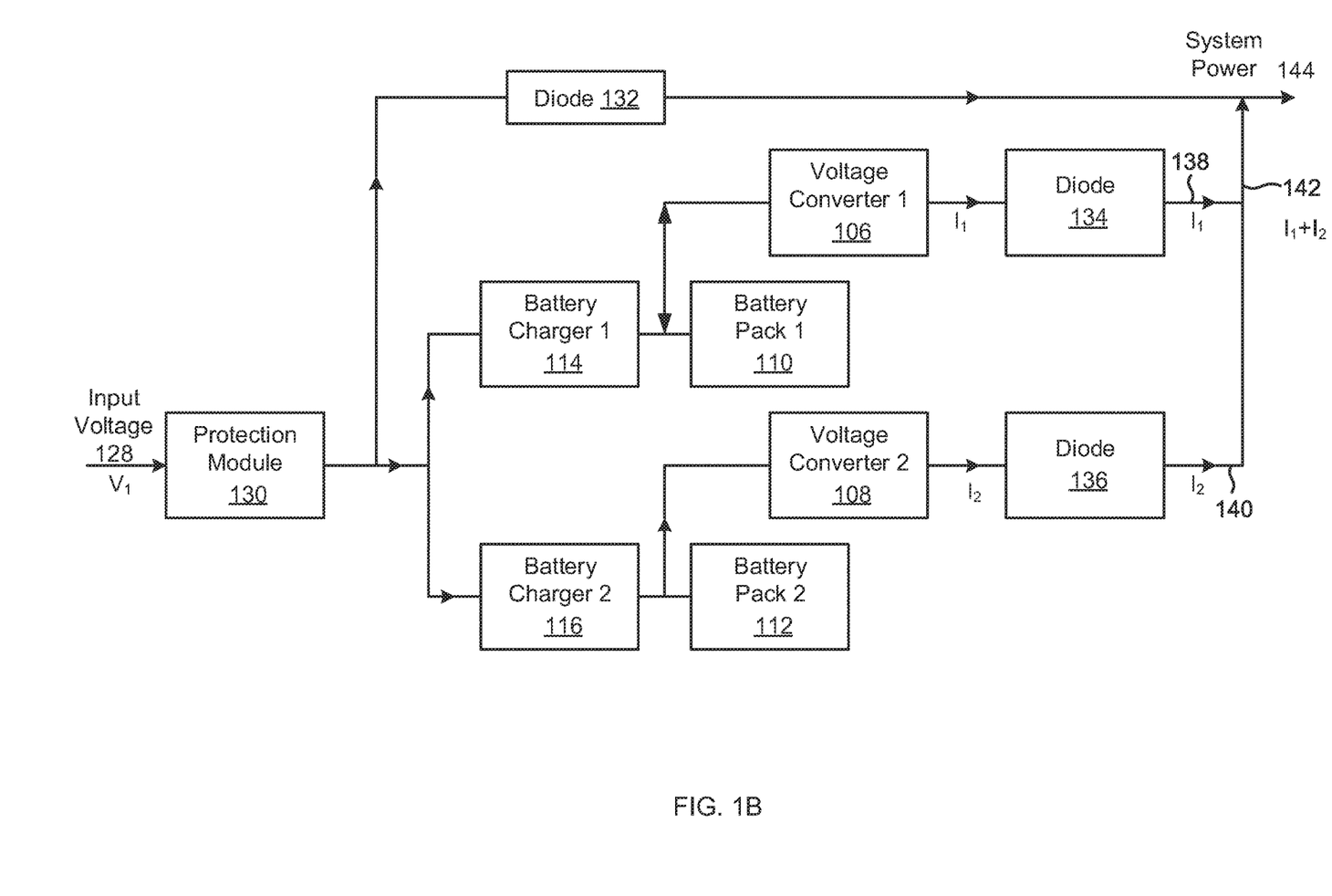
FIG. 1B shows an example of components of battery blocks of the battery management system of FIG. 1A, according to one aspect of the present disclosure.
Figure 1C:
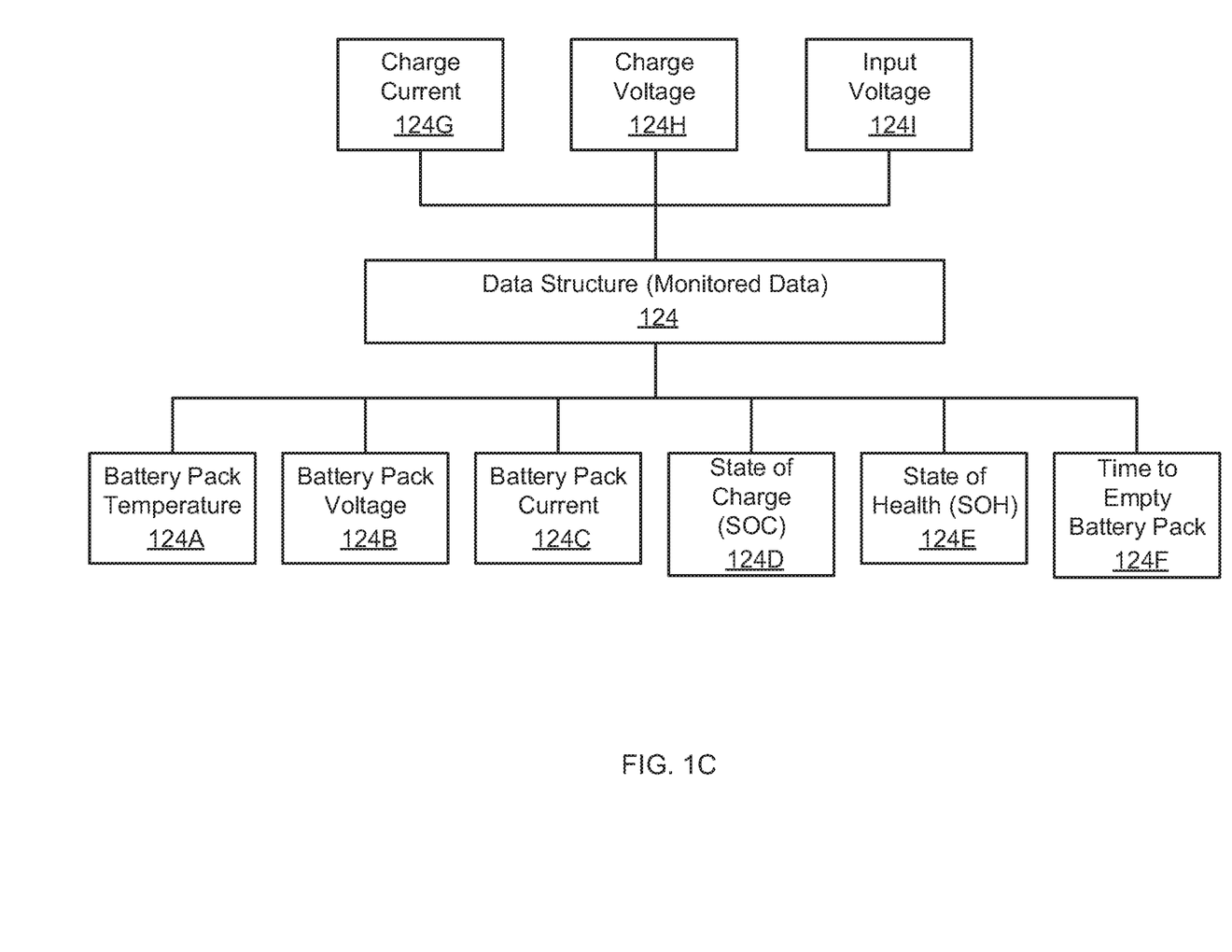
FIG. 1C shows an example of different parameters that are monitored by the battery management system, according to one aspect of the present disclosure.
Figure 1D:
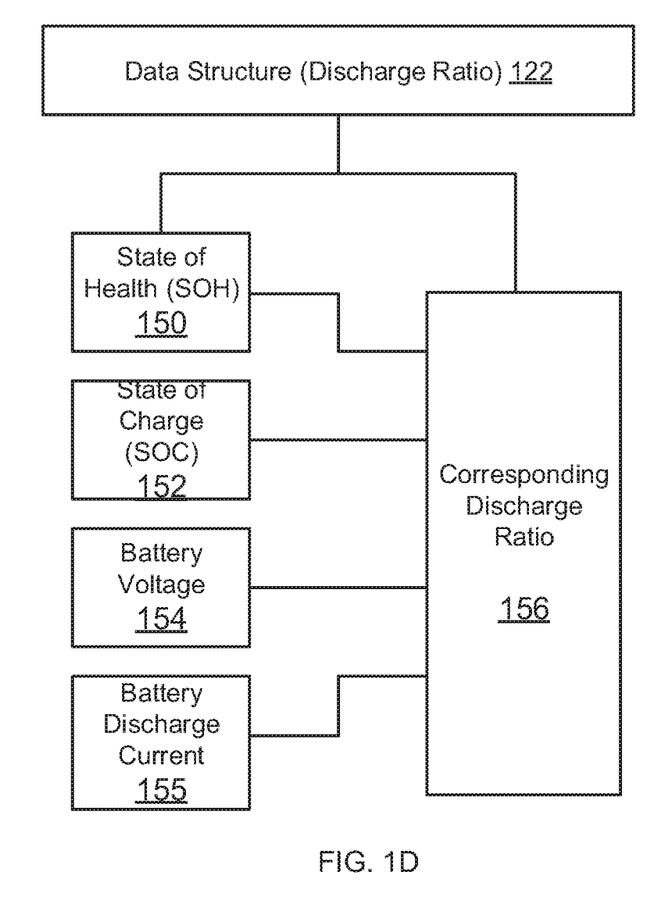
FIG. 1D shows an example of a data structure used for determining discharge ratio, according to one aspect of the present disclosure.

FIG. 1B shows a schematic of the BMS 100 for managing the discharge ratio of battery packs 110 and 112 using voltage converters 106 and 108, according to one aspect of the present disclosure. When the battery packs 110 and 112 are not being discharged, then system power 144 is based on an input voltage (V1) 128 that provides power to one or more components of an electronic device. The value and type of input voltage depends on the power requirements of the electronic device and its components. As an example, the input voltage 128 may be 17 volts DC. A protection module 130 (e.g. a fuse circuitry) protects the various components from voltage fluctuations. Diode 132 prevents any reverse current, when input voltage 128 is used for system power 144.

Input voltage 128 is also used to charge battery packs 110 and 112 via battery chargers 114 and 116. In one aspect, each battery pack's temperature is monitored and charging stops when the temperature reaches a threshold value. The charging is controlled by the battery chargers 114 and 116 based on providing a constant current and constant voltage to the battery packs 110 and 112. The constant current and voltage values will depend on the battery pack specifications. For example, a maximum charging voltage may be 4.35V, and a maximum charge current may be 2400 mA. In one aspect, the battery pack charging stops when the SOC has reached a certain level (e.g. 80%) and the ambient temperature is higher than a threshold value.

Battery pack discharge occurs when a discharge condition is met, as specified in data structure 121. When the discharge condition is met, microcontroller 120 determines a discharge ratio for the battery packs 110 and 112 from data structure 122. The discharge ratio indicates the relative discharge rate for battery packs 110 and 112. The microcontroller 120 sends a command to the voltage converters 106 and 108 to adjust an output of battery packs 110 and 112 to meet the discharge ratio. The voltage converter 106 generates an output 138 that passes through diode 134, and voltage converter 108 generates an output 140 that passes through diodes 136. Output 138 and 140 are combined to provide a joint output 142 for system power 144. The system power 144 is provided to one or more components of a device. The adjustment by the voltage converters 106 and 108 is executed to balance the SOH and/or SOC of the battery packs 110 and 112. The battery pack discharge is stopped by the microcontroller 120, when the battery temperature reaches a certain threshold level (e.g. between −20 to 60 degrees Centigrade). Process flow details for controlling the discharge ratio are now provided below.

Figure 2:
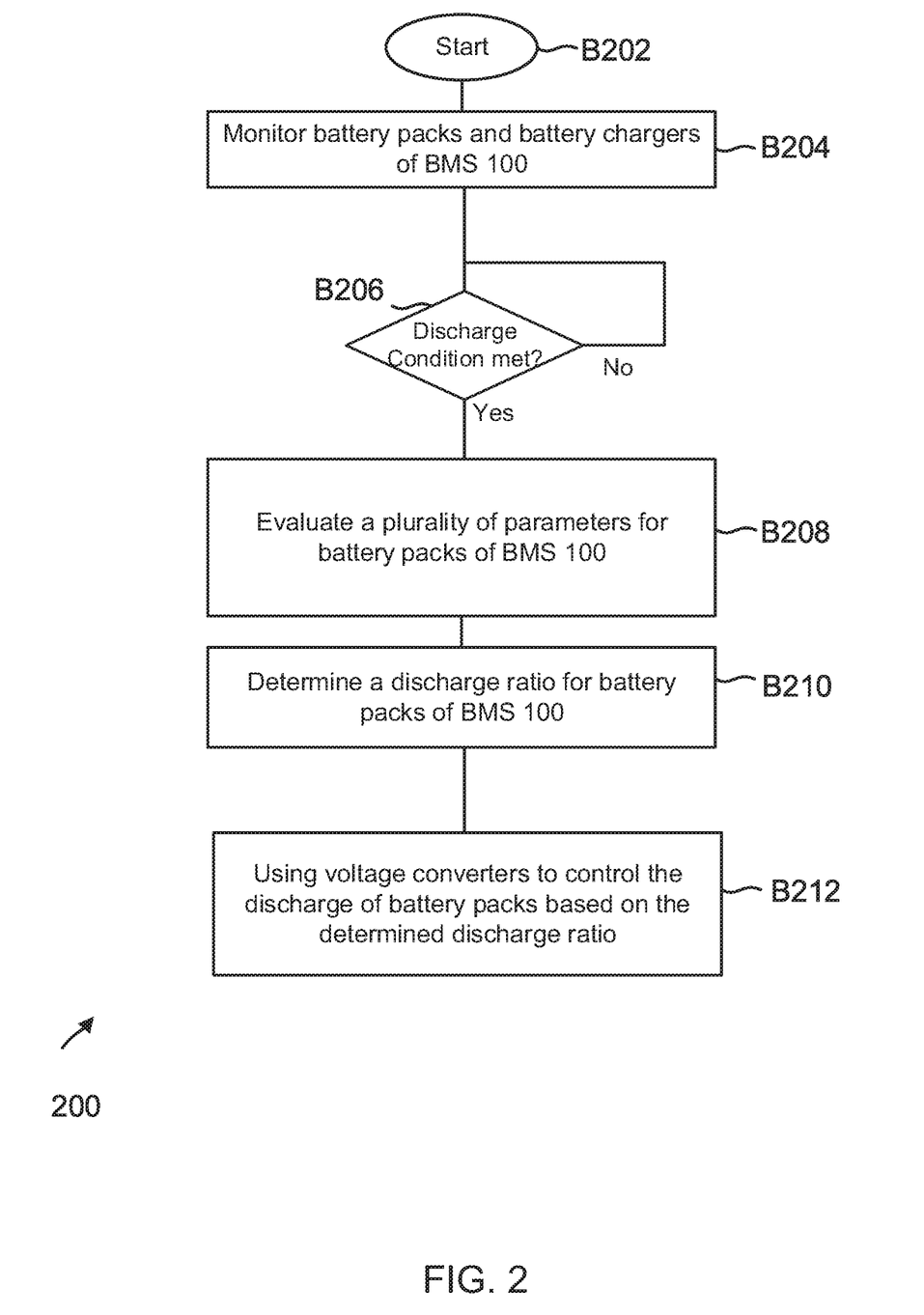
FIG. 2 shows a process flow diagram for managing discharge ratio of at least two battery packs, according to one aspect of the present disclosure.

Process Flow: FIG. 2 shows a process flow 200 for controlling discharge ratio of battery packs of BMS 100 described above with respect to FIGS. 1A-1D, according to one aspect of the present disclosure. Process 200 begins in block B202, when the battery management system 100 has been installed and is operational within an electronic system/device. The term operational as used herein means that the battery packs 110 and 112 of FIGS. 1A/1B have been charged and are in a state where they can be discharged. In block B204, the battery chargers 114 and 116 and battery packs 110 and 112 are monitored. Various data elements are collected during the monitoring and stored at data structure 124 described above with respect to FIG. 1C. The data structure 124 is stored by the microcontroller 120 at a storage location, e.g. a register (not shown), a memory device or any other device type.

In block B206, the microcontroller 120 determines if a discharge condition has been met. The microcontroller 120 makes this determination using data structure 121. If the discharge condition is not met, the process simply loops back where the battery blocks 102 and 104, and battery chargers 106 and 108 continue to be monitored.

If the discharge condition is met, then in block B208, the microcontroller evaluates a plurality of parameters of each battery pack, including a SOH, SOC and battery discharge voltage. In block B210, the microcontroller 120 uses these parameters to determine a discharge ratio for the battery packs 110 and 112 from data structure 122. In one aspect, as described above, data structure 122 is a configurable look-up-table that is pre-programmed and varies by battery pack type. The adaptive aspects disclosed herein are not limited to any specific look-up table.

Based on the determined discharge ratio, in block B212, the microcontroller 120 generates a command for voltage converters 106 and 108 to adjust the output of battery packs 106 and 108. In one aspect, the discharge ratio is controlled by alternating the output voltage setting of voltage converters 106 and 108. For example, when an output voltage at the voltage converter 106 is higher than the output voltage at the voltage controller 108, then the discharge ratio of the battery pack 110 as compared to that of the battery pack 112 is considered higher, when the output voltage at the voltage converter 106 is lower than the output of the voltage converter 108, then the discharge ratio of the battery pack 110 as compared to that of the battery pack 112 is considered lower, and the discharge ratio of the battery pack 110 as compared to that of the battery pack 112 is equal when the output voltage of both the voltage converters 106 and 108 is equal. This balances the SOH and/or SOC of each battery pack. Once the discharge condition is no longer valid, the discharge from the battery packs 110 and 112 stops.

The innovative technology using dedicated voltage converters for each battery pack to manage the battery pack discharge ratio improves how power systems are designed and operated for electronic devices. Uneven battery pack decay is avoided, while the relative SOH and SOC of each battery pack is maintained. Furthermore, because each battery pack discharge is controlled independently based on a discharge ratio, one is able to use standard off-shelf battery packs with different sizes, different output voltages, different temperature requirements, different power requirements, different geometry, different ages, and different manufacturing tolerances (e.g. capacity tolerance). The different manufacturing tolerance are provided by a battery pack manufacturer indicating a tolerance level for battery pack capacity. This is cost-effective because one does not have to develop and use custom battery packs for meeting power requirements. This also lowers development time since off-the shelf battery packs are easily available.

In one aspect, power management methods and systems are provided for electronic devices. One method includes identifying by a processor (e.g. microcontroller 120, FIG. 1A), a discharge condition of a first battery pack (e.g. 110) of a battery system (e.g. 100 having at least the first battery pack and a second battery pack (e.g. 112) to provide charge to one or more components of an electronic device (e.g. 300, FIG. 3); in response to the discharge condition, evaluating by the processor, a plurality of parameters (e.g. using data structure 124) associated with the first battery pack and the second battery pack, the plurality of parameters are at least indicative of one of a state of health and a state of charge of the first battery pack and the second battery pack; determining by the processor, a discharge ratio for the first battery pack and the second battery pack based on evaluation of the plurality of parameters (e.g. using data structure 122), the discharge ratio being indicative of a relative discharge rate of the first battery pack and the second battery pack; and discharging the first battery pack and the second battery pack based on the discharge ratio, the discharge ratio controlled by a first voltage controller (e.g. 106) coupled to an output of the first battery pack and a second voltage controller (e.g. 108) coupled to the second battery pack.

In yet another aspect, another method includes storing a data structure (e.g. 122, FIG. 1D) at a memory device by a processor (e.g. 120, FIG. 1A), where the data structure is configured to store a plurality of parameters used for determining a discharge ratio of a first battery pack and a second battery pack of a charging system of a device, the discharge ratio indicating a relative rate of discharge of the first battery pack (e.g. 110, FIG. 1B) and the second battery pack (e.g. 112, FIG. 1B); detecting by the processor, a discharge condition associated with at least one of the first battery pack and the second battery pack; utilizing by the processor, the data structure for determining the discharge ratio; and controlling by the processor, based on the determined discharge ratio, a discharge rate of the first battery pack using a first voltage controller (e.g. 106, FIG. 1B) and a discharge rate of the second battery pack using a second voltage controller (e.g. 108, FIG. 1B).

Figure 3:
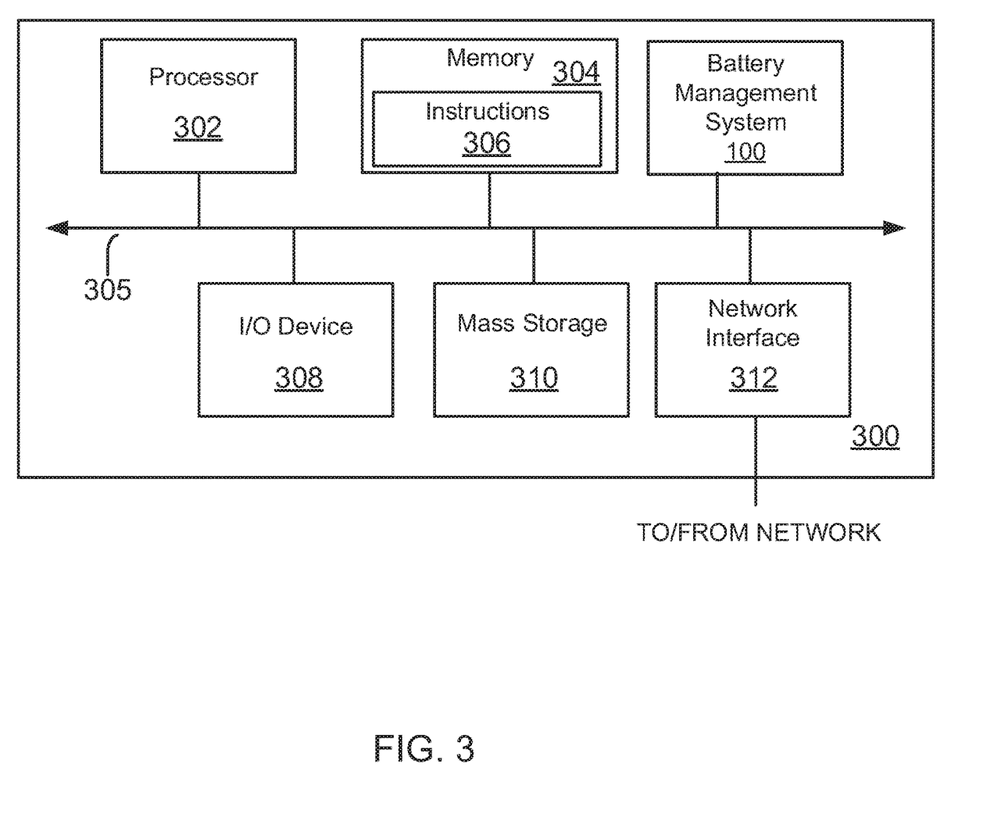
FIG. 3 shows a block diagram of a computing system, used according to one aspect of the present disclosure.

Processing System: FIG. 3 is a high-level block diagram showing an example of the architecture of an electronic device/system (referred to as device) 300 that may use BMS 100, described above in detail. As an example, device 300 can represent a computing device, a seat device, or any other electronic device. Note that certain standard and well-known components which are not germane to the present aspects are not shown in FIG. 3.

In one aspect, device 300 includes one or more processor(s) 302 (similar to processor 126 of FIG. 1A) and memory 304, coupled to a bus system 305. The bus system 305 shown in FIG. 3 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a HyperTransport or industry standard architecture (ISA) bus, a small computer system interface (SCSI) bus, a universal serial bus (USB), I2C or an Institute of Electrical and Electronics Engineers (IEEE) standard 1394 bus (sometimes referred to as "Firewire") or any other interconnect type.

The processor(s) 302 are the central processing units (CPUs) of device 300 and, thus, control its overall operation. In certain aspects, the processors 302 accomplish this by executing software stored in memory 304. A processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 304 represents any form of random access memory (RAM), read-only memory (ROM), flash memory, or the like, or a combination of such devices. Memory 304 includes the main memory of the processing system 300. Instructions 306 may be used to implement data structures 122 and 124 and/or the process steps of FIG. 2 described above.

Also connected to the processors 302 through the bus system 305 are one or more internal mass storage devices 310, and a network interface 312. Internal mass storage devices 310 may be, or may include any conventional medium for storing large volumes of data in a non-volatile manner, such as one or more magnetic or optical based disks, flash memory, or solid-state drive.

The network interface 312 provides the processing system 300 with the ability to communicate with remote devices (e.g., over a network) and may be, for example, an Ethernet adapter or the like.

Device 300 also includes one or more input/output (I/O) device 308 coupled to the bus system 305. The I/O device 308 may include, for example, a display device, a keyboard, a mouse, etc. The I/O device may be in the form of a handset having one or more of the foregoing components, such as a display with a real or virtual keyboard, buttons, and/or other touch-sensitive surfaces.

It is noteworthy that although device 300 has been described above using various components, the innovative technology described above may be implemented in a device that has more or fewer components than device 300. The disclosure herein is not limited to any specific device and can be implemented in any system that uses power and processing logic. For example, the BMS system 100 may be used to interface with solar panels. The solar panels may be used to charge the battery packs. The mechanism described above control the discharge ratio from the battery packs to supply power when the solar panels are not generating power. Furthermore, the BMS 100 may be used in an electric car where a plurality of battery packs are used to power the electric car. The methods and systems disclosed above may be used to control the discharge ratios of the battery packs. In another aspect, although the foregoing disclosure has been described using multiple battery packs, BMS 100 may be used in a single battery pack with multiple cells.

Thus, methods and systems for efficiently managing discharge ratio of a plurality of battery packs have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
identifying, by a processor, a discharge condition of a first battery pack of a battery system having at least the first battery pack and a second battery pack to provide charge to one or more components of an electronic device, the discharge condition defined by a specification of the first battery pack and a battery type;
in response to identifying the discharge condition, evaluating, by the processor, a plurality of parameters associated with the first battery pack and the second battery pack; wherein the plurality of parameters are at least indicative of a state of health and a state of charge of the first battery pack and the second battery pack, the state of health indicating health of the first battery pack compared to an initial state of the first battery pack and health of the second battery pack compared to an initial state of the second battery pack; and the state of charge is a level of charge of the first battery pack relative to its total capacity and a level of charge of the second battery pack relative to its total capacity;
determining, by the processor, a discharge ratio for the first battery pack and the second battery pack based on evaluation of the plurality of parameters; wherein the discharge ratio is indicative of a relative discharge rate of the first battery pack and the second battery pack;
generating, by the processor, a command for a first voltage converter of the first battery pack to adjust an output of the first battery pack and for a second voltage converter of the second battery pack to adjust an output of the second battery pack to meet the discharge ratio for balancing the state of health and the state of charge of the first battery pack and the second battery pack; and
in response to the command, discharging the first battery pack and the second battery pack, wherein the discharge ratio is controlled by the first voltage converter by controlling the output of the first battery pack and the second voltage converter, operating independent of the first voltage converter, controlling the output of the second battery pack.

2. The method of claim 1, wherein the first battery pack and the second battery pack have different ages.

3. The method of claim 1, wherein the first battery pack and the second battery pack have different geometry.

4. The method of claim 1, wherein the first battery pack and the second battery pack have different sizes.

5. The method of claim 1, wherein the processor uses a data structure to look up the discharge ratio based on the plurality of parameters.

6. The method of claim 5, wherein the data structure stores the plurality of parameters that include a state of health indicator, a state of charge value and a discharge voltage value for the first battery pack and the second battery pack.

7. The method of claim 1, wherein the first battery pack and the second battery pack have different power ratings.

8. A non-transitory machine readable medium having stored thereon instructions for performing a method comprising machine executable code which when executed by at least one machine, causes the machine to:
identify a discharge condition of a first battery pack of a battery system having at least the first battery pack and a second battery pack to provide charge to one or more components of an electronic device, the discharge condition defined by a specification of the first battery pack and a battery type;
in response to identifying the discharge condition, evaluate a plurality of parameters associated with the first battery pack and the second battery pack; wherein the plurality of parameters are at least indicative of a state of health and a state of charge of the first battery pack and the second battery pack, the state of health indicating health of the first battery pack compared to an initial state of the first battery pack and health of the second battery pack compared to an initial state of the second battery pack; and the state of charge is a level of charge of the first battery pack relative to its total capacity and a level of charge of the second battery pack relative to its total capacity;
determine a discharge ratio for the first battery pack and the second battery pack based on evaluation of the plurality of parameters; wherein the discharge ratio is indicative of a relative discharge rate of the first battery pack and the second battery pack;
generate a command for a first voltage converter of the first battery pack to adjust an output of the first battery pack and for a second voltage converter of the second battery pack to adjust an output of the second battery pack to meet the discharge ratio for balancing the state of health and the state of charge of the first battery pack and the second battery pack; and
in response to the command, discharge the first battery pack and the second battery pack, wherein the discharge ratio is controlled by the first voltage converter by controlling the output of the first battery pack and the second voltage converter, operating independent of the first voltage converter, controlling the output of the second battery pack.

9. The non-transitory machine readable medium of claim 8, wherein the first battery pack and the second battery pack have different ages.

10. The non-transitory machine readable medium of claim 8, wherein the first battery pack and the second battery pack have different geometry.

11. The non-transitory machine readable medium of claim 8, wherein the first battery pack and the second battery pack have different sizes.

12. The non-transitory machine readable medium of claim 8, wherein a data structure is used to look up the discharge ratio based on the plurality of parameters.

13. The non-transitory machine readable medium of claim 12, wherein the data structure stores the plurality of parameters that include a state of health indicator, a state of charge value and a discharge voltage value for the first battery pack and the second battery pack.

14. The non-transitory machine readable medium of claim 8, wherein the first battery pack and the second battery pack have different power ratings.

15. A method, comprising:
storing, by a processor, a data structure at a memory device, wherein the data structure is configured to store a plurality of parameters used for determining a discharge ratio of a first battery pack and a second battery pack of a charging system of a device to balance a state of health and a state of charge of the first battery pack and the second battery pack, the discharge ratio indicating a relative rate of discharge of the first battery pack and the second battery pack; wherein the state of health indicates health of the first battery pack compared to an initial state of the first battery pack and health of the second battery pack compared to an initial state of the second battery pack; and the state of charge indicates a level of charge of the first battery pack relative to its total capacity and a level of charge of the second battery pack relative to its total capacity detecting, by the processor, a discharge condition associated with at least one of the first battery pack and the second battery pack, the discharge condition defined by a specification of the first battery pack and the second battery pack and a battery type of the first battery pack and the second battery pack;

utilizing, by the processor, the data structure for determining the discharge ratio; and controlling, by the processor, based on the determined discharge ratio, a discharge rate of the first battery pack using a first voltage converter and a discharge rate of the second battery pack using a second voltage converter, the second voltage converter operating independent of the first voltage converter.

16. The method of claim 15, wherein the device is a portable computing device.

17. The method of claim 15, wherein the device is a seat device interfacing with an in-flight entertainment system of an aircraft.

18. The method of claim 15, wherein the first battery pack and the second battery pack have different ages.

19. The method of claim 16, wherein the plurality of parameters include a state of health indicator, a state of charge value and a discharge voltage value.

20. The method of claim 15, wherein the first battery pack and the second battery pack have different power ratings.

21. The method of claim 1, wherein the first battery pack and the second battery pack have different manufacturing tolerance.

* * * * *